Nov. 19, 1968    F. W. SINCLAIR    3,411,458

RAILWAY BOGIE AUXILIARY SPRING BOLSTER

Filed Oct. 24, 1965    2 Sheets-Sheet 1

INVENTOR
FREDERICK WILLIAM SINCLAIR
BY Young + Thompson
ATTORNEYS

INVENTOR
FREDERICK WILLIAM SINCLAIR
BY
Young + Thompson
ATTORNEYS

United States Patent Office 3,411,458
Patented Nov. 19, 1968

3,411,458
RAILWAY BOGIE AUXILIARY SPRING BOLSTER
Frederick William Sinclair, Gloucester, England, assignor to Gloucester Railway Carriage & Wagon Company Limited, Gloucester, England
Filed Oct. 24, 1965, Ser. No. 504,444
Claims priority, application Great Britain, Oct. 27, 1964, 43,703/64
8 Claims. (Cl. 105—185)

ABSTRACT OF THE DISCLOSURE

A bogie truck, of the spring plankless type, for a rail vehicle comprises a pair of spaced rigid side frames, a transverse member extending between and interconnecting said side frames, two suspension systems housed in the respective side frames and supporting respective ends of the transverse member to accommodate vertical movement of the latter, and a floating bolster. The transverse member is opened out in plan view making it recessed and the bolster is disposed and supported within the transverse member in a manner which allows substantial relative movement between the bolster and transverse member only in a generally horizontal direction.

---

This invention relates to bogie trucks for rail vehicles. It is particularly concerned with what is known as "spring plankless" type bogies in which a single transverse member interconnects the side frames of the bogie, the transverse member being mounted for vertical movement on a suspension system.

According to the invention a bogie truck for a rail vehicle comprises a pair of rigid side frames interconnected by a transverse member which is connected to the side frames through a suspension system which accommodates vertical movement of the transverse member, and a floating bolster supported by the transverse member in a manner which allows substantial relative movement between the bolster and transverse member only in a generally horizontal direction.

Preferably, the floating bolster is supported by the transverse member in a manner which only allows substantial relative movement between the bolster and transverse member in a lateral horizontal direction. Thus the support of the bolster relatively to the transverse member controls only traction and braking forces, and forces due to lateral movement or side sway of the vehicle when in motion, and vertical suspension movement is taken by the normal suspension of the transverse member.

The bolster directly supports the truck or other vehicle body in the usual manner and the mounting of the bolster is conveniently through rubber elements which, in accordance with the invention, oppose the forces of traction whilst allowing lateral swing of the bolster without providing vertical movement relatively to the transverse member under dynamic conditions. The rubber elements may be of sandwich, conical, or other suitable form arranged to restrict and virtually eliminate vertical movement.

The transverse member may be "opened out" in plan view to provide a central aperture in which the independent bolster is inserted and supported, the upper surface of the bolster being provided with the usual load bearing centre pivot and side bearers for the vehicle body.

A bogie truck having a floating bolster in accordance with the invention will now be described by way of example with reference to the accompanying drawings in which.

Figure 1:
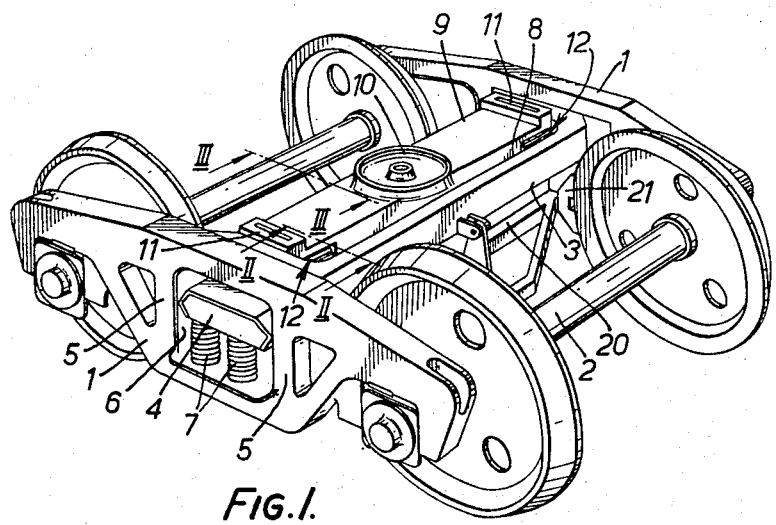
FIGURE 1 is a somewhat diagrammatic perspective view of the bogie truck.

The truck has a pair of cast steel rigid side frames 1 provided with outside journal bearings for the usual two wheel axles 2 arranged adjacent the ends of the side frames. In addition to the axles 2 the side frames 1 are interconnected by a transverse member 3 which is positioned centrally between the axles and the ends 4 of which engage between guide columns 5 in guide apertures 6 in the side frames.

The ends 4 of the transverse member 3 are supported on suspension spring groups 7 within the guide apertures 6, and these provide the main suspension which accommodates vertical movement of the transverse member under dynamic conditions. Such movement is damped by frictional damping or "snubing" means (not shown) which engage the transverse member 3 and are mounted in the guide colums 5.

Figure 2:
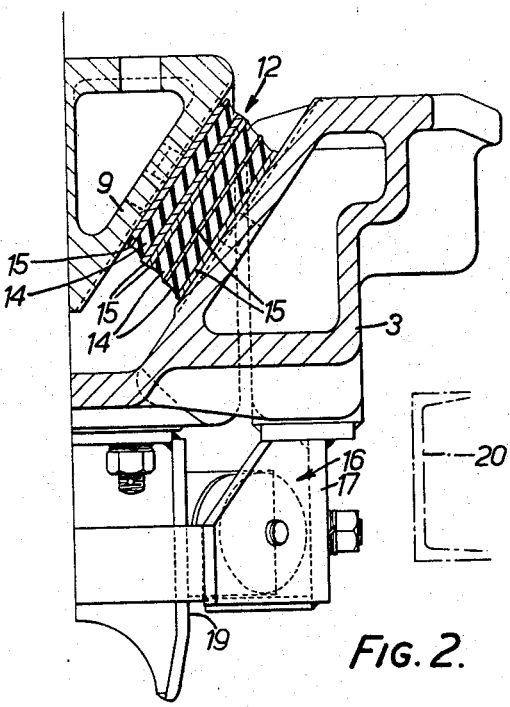
FIGURES 2 and 3 are sections to a larger scale on the lines II—II and III—III, respectively, of FIGURE 1.
Figure 3:
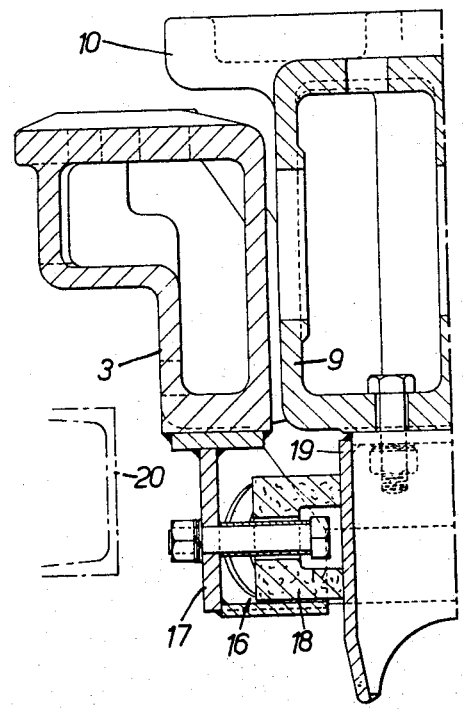
Figure 4:
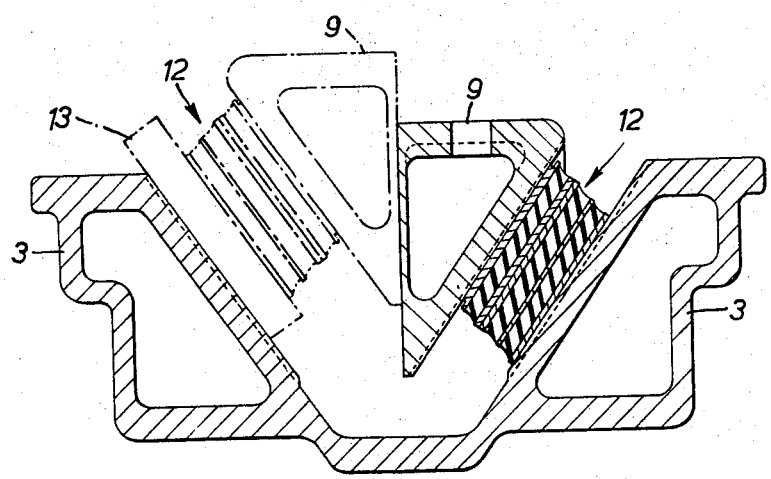
FIGURE 4 is a scrap view of FIGURE 2 showing a feature of the invention.

The transverse member 3 is opened out in plan view to provide a rectangular aperture 8 which extends at its ends close to the side frames and within which a floating bolster 9 in inserted. The bolster 9 is formed with the usual load bearing centre pivot 10 and side bearers 11 for the vehicle body (not shown) which is mounted on the bogie truck in the usual manner. The bolster 9 is mounted in the transverse member 3 on rubber sandwich units indicated generally at 12 (see more particularly FIGURE 2), one such unit being provided adjacent each corner of the bolster. Each rubber unit 12 is disposed transversely of the bogie truck and inclined at an angle of some 35° from the vertical. Packing pieces 13 (FIGURE 4) can be inserted beneath the rubber units 12 to provide height adjustment for the bolster 9.

The described arrangement of rubber units 12, each of which incorporates three layers of rubber 14 alternating with steel plates 15, allows movement of the bolster 9 in a generally horizontal plane relatively to the transverse member 3 and restricts and substantially eliminates relative vertical movement. Thus the rubber units 12 do not provide a suspension for the bolster 9 in the normal sense, vertical suspension movement being accommodated by the spring suspension of the transverse member 3, and the units act to control traction and braking forces and forces due to lateral movement or side sway of the vehicle when in motion.

To prevent undue relative lateral movement between the transverse member 3 and the bolster 9, frictional damping means 16 are provided centrally at the front and rear of the transverse member. Each damping means 16 is mounted in a housing 17 provided on the transverse member and each frictional element 18 of the means engages a vertical surface 19 on the bolster 9. A normal brake beam 20 fitted with brake shoes 21 is provided.

Although the described arrangement has a conventional spring suspension 7 for the transverse member 9 itself it will be appreciated that the transverse member could also be suspended by resilient elements such as rubber units. Such rubber units would be arranged to accommodate normal vertical suspension movement under dynamic conditions, and the arrangement may be in accordance with Patent No. 2,981,208.

I claim:
1. A bogie truck, of the spring plankless type, for a rail vehicle comprising a pair of spaced rigid side frames, a transverse member extending between and interconnecting said side frames, two suspension systems housed in the respective side frames and supporting respective ends of the transverse member to accommodate vertical movement of the latter, and a floating bolster, the trans- verse member being opened out in plan view making it recessed and the bolster being disposed and supported within the transverse member in a manner which allows substantial relative movement between the bolster and transverse member only in a generally horizontal direction.

2. A bogie truck according to claim 1, wherein the floating bolster is supported by the transverse member in a manner which allows substantial relative movement between the bolster and the transverse member in a lateral horizontal direction.

3. A bogie truck, of the spring plankless type, for a rail vehicle comprising a pair of spaced rigid side frames, a recessed transverse member extending between and interconnecting said side frames, two suspension systems housed in the respective side frames and supporting respective ends of the transverse member to accommodate vertical movement of the latter, a floating bolster disposed within the transverse member, and rubber elements disposed at respective corners of the bolster to mount the latter within the transverse member in a manner which allows substantial relative movement between the bolster and transverse member only in a generally horizontal direction.

4. A bogie truck according to claim 3 and further comprising packing pieces for insertion beneath the rubber elements to provide height adjustment for the bolster.

5. A bogie truck according to claim 3, wherein the rubber elements are disposed transversely of the truck and inclined at an angle from the vertical.

6. A bogie truck according to claim 3, wherein the rubber elements are disposed transversely of the truck and inclined at an angle of 35° from the vertical.

7. A bogie truck, of the spring plankless type, for a rail vehicle comprising a pair of spaced rigid side frames, a recessed transverse member extending between and interconnecting said side frames, two suspension systems housed in the respective side frames and supporting respective ends of the transverse member to accommodate vertical movement of the latter, a floating bolster disposed within the transverse member, rubber elements disposed at respective corners of the bolster to mount the latter within the transverse member in a manner which allows substantial relative movement between the bolster and transverse member only in a generally horizontal direction, the rubber elements being disposed transversely of the truck and inclined at an angle from the vertical, and further comprising frictional damping means, a housing on the transverse member for said damping means and a vertical surface on the bolster for engagement by the damping means.

8. A bogie truck according to claim 7 wherein the frictional damping means are disposed centrally at the front and rear of the transverse member.

References Cited

UNITED STATES PATENTS

| | | | |
|---|---|---|---|
| 2,061,767 | 11/1926 | Hobson | 105—197 |
| 2,066,602 | 1/1937 | Barrows et al. | 105—197 |
| 2,099,031 | 11/1937 | Neal et al. | 105—197 |
| 2,617,366 | 11/1952 | Piron | 105—197 |

ARTHUR L. LA POINT, *Primary Examiner.*

H. BELTRAN, *Assistant Examiner.*